Oct. 18, 1932.  C. W. J. HEDBERG  1,883,372
CONDITIONING GASES FOR ELECTRICAL PRECIPITATION
Filed Jan. 7, 1928
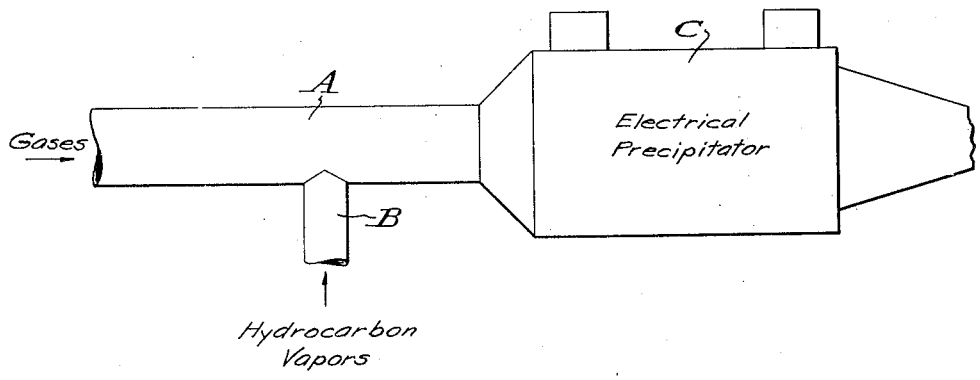
Inventor
Carl W. J. Hedberg
Attorneys.

Patented Oct. 18, 1932

1,883,372

UNITED STATES PATENT OFFICE

CARL W. J. HEDBERG, OF MIDDLESEX, NEW JERSEY, ASSIGNOR TO RESEARCH CORPORATION, OF NEW YORK, N. Y., A CORPORATION OF NEW YORK

CONDITIONING GASES FOR ELECTRICAL PRECIPITATION

Application filed January 7, 1928. Serial No. 245,173.

This invention relates to the recovery of suspended materials from a stream of gas by the action of an electrical field between electrodes maintained at a high potential difference, as in the well known Cottrell process.

The invention particularly relates to a method of electrical precipitation in which a conditioning agent is introduced into the gas stream carrying the suspended particles, which it is desired to recover or precipitate.

The conditioning agent which I employ is a hydrocarbon vapor, fog or mist, such as that obtained by vaporizing and partially condensing, or spraying hydrocarbon compounds, such as oil, tar, pitch, or by addition of volatile products from destructive distillation of carbonaceous material. The process is particularly applicable to the electrical precipitation of dust, soot, lamp-black, or other suspended particles from hot, dry gases, such as the gases from iron blast furnaces, carbon black furnaces, gas producers and the like.

For example, in iron blast furnace practice, it is customary to remove the dust carried in suspension in the gases coming from the top of the furnace prior to use as gaseous fuel in hot-blast stoves and boilers. This is advantageously accomplished by electrical precipitation. I have found that by adding hydrocarbon vapors, fogs, or mists, to these furnace gases, the efficiency of the electrical precipitation is greatly increased in that with a given precipitator, higher voltages may be used resulting in higher dust recoveries at equal or greater rates of treatment and lower power consumption. The amount of hydrocarbon vapor, fog or mist supplied to the gas may be not more than 0.5 grain per cubic foot of gas, though more or less than this amount may be used, according to circumstances.

The invention is applicable to the electrical precipitative treatment of gases even at high temperatures, and has been successfully used at temperatures about 600° F., a range high enough to include all industrial conditions heretofore encountered. The source of the hydrocarbon vapors, fogs or mists does not appear to be important as I have used those obtained from oils, and other hydrocarbon compounds whose boiling points varied from atmospheric temperatures to over 600° F.

The hydrocarbon vapors, fogs or mists may be added to the gas stream in a great variety of ways. For example, in treating blast furnace gases, the desired effect may be produced by adding bituminous coal, oil or tar at the top of the furnaces, these materials being distilled or vaporized by the heat of the gases.

In the treatment of the gases from carbon-black furnaces, the gases carrying the suspended matter may be carried through some kind of a mechanical mixing apparatus, such as a series of rotating discs dipping into a pool of hydrocarbon liquid.

The hydrocarbons may be injected into the hot gas stream as a fog or mist by a steam or air jet, or may be supplied in the form of still vapors or producer gas carrying volatiles.

The accompanying drawing diagrammatically illustrates the invention in which A is the flue carrying the hot gases, B is the conduit for introducing hydrocarbon vapors, fogs or mists and C is the electrical precipitator. The precipitator may be of the well known construction, comprising electrodes maintained at a high potential difference between which pass the dust or fume laden gases, and is preferably operated by unidirectional current.

In addition to the advantages above mentioned, the use of hydrocarbon vapors, fogs, or mists has further advantages, in that the unprecipitated portion increases the thermal value of gases which, after being freed from dust, are to be burned, while the precipitated portion which is of a tacky or sticky nature is deposited on the collecting electrodes, and serves to prevent the deposited dust and fume like material from disintegrating into fine particles as it falls off the collecting electrodes by converting it into a coherent but friable deposit, this feature being of particular value when the collecting electrodes are of the semi-conducting type.

I claim:

1. The process of separating suspended particles from gases which consists in supplying hydrocarbons in a fluid state to such gases in an amount sufficient to substantially alter the electrical characteristics of the gases, and by means of a corona discharge, precipitating the particles suspended in the gases in a friable state.

2. The process which consists in supplying to a stream of gases containing suspended particles, hydrocarbons in a fluid state in an amount sufficient to substantially alter the electrical characteristics of the gases and then passing the gases thus conditioned between electrodes maintained at a high potential difference and recovering the suspended particles in a friable state.

3. The process of separating suspended particles from hot furnace gases which consists in supplying hydrocarbons in a fluid state to such gases in an amount sufficient to substantially alter the electrical characteristics of the gases; and by means of a corona discharge precipitating the particles suspended in the gases in a friable state.

4. The process which consists in supplying to a stream of hot furnace gases containing suspended particles, hydrocarbons in a fluid state in an amount sufficient to substantially alter the electrical characteristics of the gases and then passing the gases thus conditioned between electrodes maintained at a high potential difference, and recovering the suspended particles in a friable state.

5. The process of separating suspended particles from gases which consists in supplying to such gases about 0.5 grain of hydrocarbons in a fluid state per cubic foot of gas, and precipitating the particles suspended in the gases by means of a corona discharge.

6. The process which consists in supplying to a stream of gases containing suspended particles about 0.5 grain of hydrocarbons in a fluid state per cubic foot of gas and then passing the gases thus conditioned between electrodes maintained at a high potential difference and recovering the suspended particles.

7. The process of separating suspended particles from gases at temperatures above 212° F. which consists in supplying to such gases hydrocarbons in a fluid state, precipitating the particles from the gases by subjecting said gases to a strong electric field and recovering the particles as a friable agglomerate.

In testimony whereof, I affix my signature.

CARL W. J. HEDBERG.